United States Patent [19]

Hartlepp

[11] Patent Number: 4,759,439
[45] Date of Patent: Jul. 26, 1988

[54] DRIVE MECHANISM

[75] Inventor: Karl H. Hartlepp, Burlington, Canada

[73] Assignee: Dominion Chain Inc., Stratford, Canada

[21] Appl. No.: 107,017

[22] Filed: Oct. 13, 1987

[30] Foreign Application Priority Data

Jan. 29, 1987 [CA] Canada ............................ 528486

[51] Int. Cl.$^4$ .............................................. B65G 23/14
[52] U.S. Cl. .................................... 198/833; 198/854; 104/208; 104/212
[58] Field of Search ............... 198/364, 365, 370, 372, 198/833, 838, 795, 861.1–861.6, 854; 104/204, 208, 211, 212, 214–218, 222, 224, 233

[56] References Cited

U.S. PATENT DOCUMENTS

| | | | |
|---|---|---|---|
| 585,873 | 7/1897 | Martin | 104/214 X |
| 2,609,086 | 9/1952 | McBride et al. | 198/833 X |
| 3,435,782 | 4/1969 | Stewart | 104/204 X |
| 3,827,372 | 8/1974 | Laurent | 104/217 X |
| 3,871,303 | 3/1975 | Woodling | 104/217 X |
| 4,004,681 | 1/1977 | Clewett et al. | 198/365 |
| 4,102,448 | 7/1978 | Wolbrink et al. | 198/365 |
| 4,233,907 | 11/1980 | Brown et al. | 198/833 X |
| 4,278,165 | 7/1981 | Nielsen et al. | 198/365 |
| 4,399,904 | 8/1983 | Canziani | 198/365 |

Primary Examiner—Robert J. Spar
Assistant Examiner—Lyle K. Kimms
Attorney, Agent, or Firm—Barnes, Kisselle, Raisch, Choate, Whittemore & Hulbert

[57] ABSTRACT

This invention provides a drive system for moving wheeled structures longitudinally along a supporting track. The drive system includes an element extending longitudinally below the track and having an upwardly inclined ramp portion, a main portion extending in parallel with the track and leading from the ramp portion, and a downwardly extending portion leading from the main portion. A drive system is adapted to drive the element such that the main portion moves at a speed equal to that at which the wheeled structure is intended to move and a gripper mechanism is provided for attachment to the wheeled structure to engage with the element. The gripper mechanism includes a gripper device moveable vertically upwards from a rest position to an engaged position, and including an engagement device for meeting the element at the ramp portion so that as the wheeled structure moves along the track the element moves the gripper device into the engaged position where the gripper device is locked on the element to move with the element.

7 Claims, 3 Drawing Sheets

DRIVE MECHANISM

This invention relates to a drive system for use with wheeled structures running on a track to move the structures along the track, the drive system engaging automatically and being particularly useful with conveyor systems made up of an endless conveyor of cars running on the track.

The drive system according to the present invention will be described with particular reference to an endless conveyor made up of a plurality of cars carried on a track and moved by the drive system along the track. However, the drive system could also be used, for instance, to propel railway cars over humps in a gravitational marshalling yard, such as those used to segregate the cars into several trains. Other uses will become evident from the subsequent description.

In conveyor systems, the drive system commonly consists of a heavy chain arranged with an upper portion running under a track for engagement with a sprocket or other device associated with the conveyor. As the conveyor moves along the track, the sprockets engage the chain and are projected forwardly by the driven chain to maintain the speed of the conveyor. Clearly because the chain is a modular system, there will be an impact between the chain and the sprocket, as the sprocket engages with the chain. This makes for a noisy arrangement, not to mention one which is subject to significant wear caused by the impacts It is an object of the present invention to provide an improved drive system which is not dependent on a preferred longitudinal location between the drive mechanism and the travelling conveyor. The conveyor should engage the drive system in any position, so that there is infinite variation in the longitudinal positions with no impact location. This is intended to make for a quiet arrangement and one which is effective and simple to make, use and service.

In accordance with an aspect of the invention, a drive system is provided for moving wheeled structures longitudinally along a supporting track. The drive system includes an element extending longitudinally below the track and having an upwardly inclined ramp portion, a main portion extending in parallel with the track and leading from the ramp portion, and a downwardly extending portion leading from the main portion. A drive system is adapted to drive the element such that the main portion moves at a speed equal to that at which the wheeled structure is intended to move and a gripper mechanism is provided for attachment to the wheeled structure to engage with the element. The gripper mechanism includes gripper means moveable vertically upwards from a rest position to an engaged position, and including an engagement means for meeting the element at the ramp portion so that as the wheeled structure moves along the track the element moves the gripper means into the engaged position where the gripper means is locked on the element to move with the element.

The invention will be better understood with reference to the drawings, in which.

Figure 2:
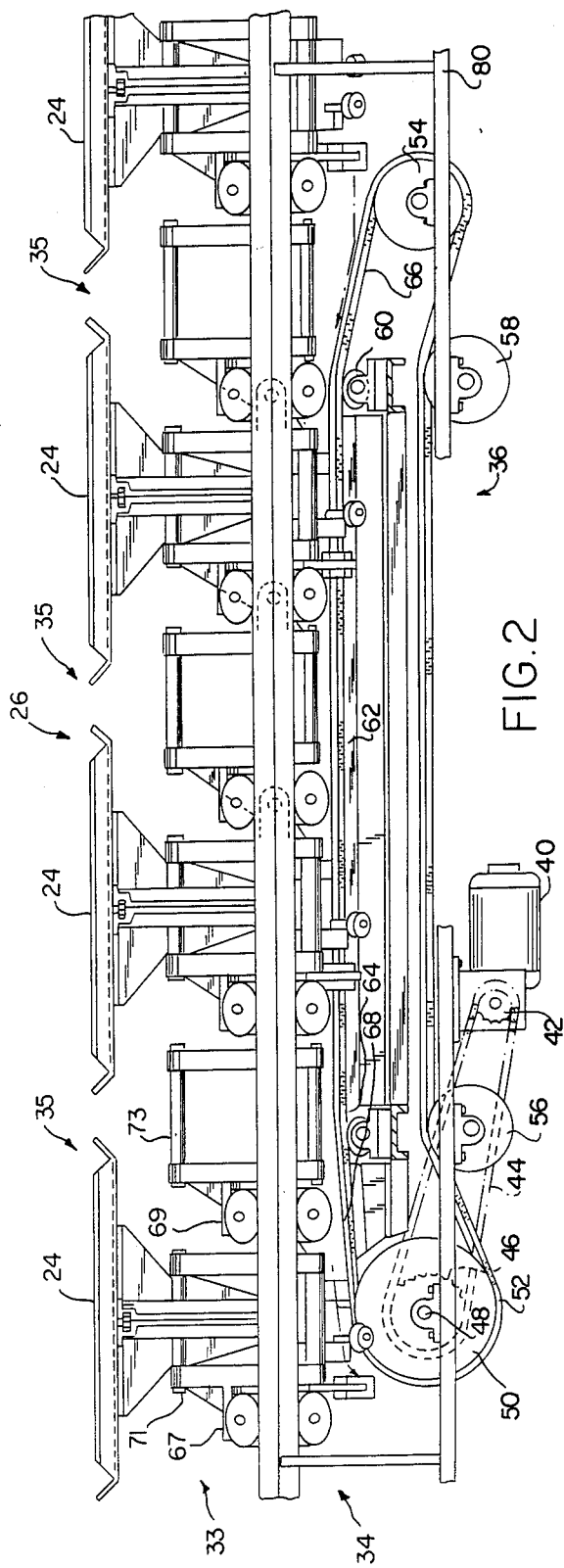
FIG. 2 is a side view of the drive mechanism and shown attached to the exemplary endless conveyor system to drive the cars about the system.
Figure 5:
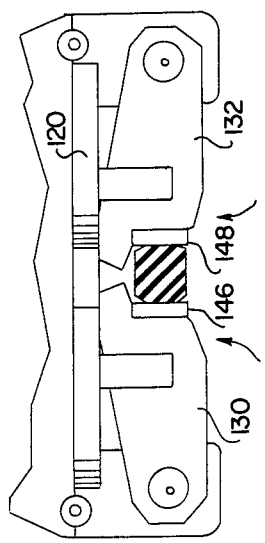
Figure 4:
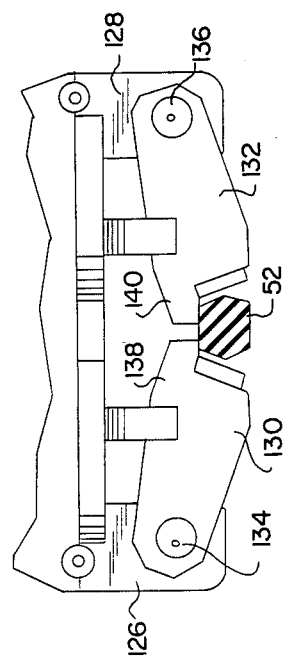
Figure 3:
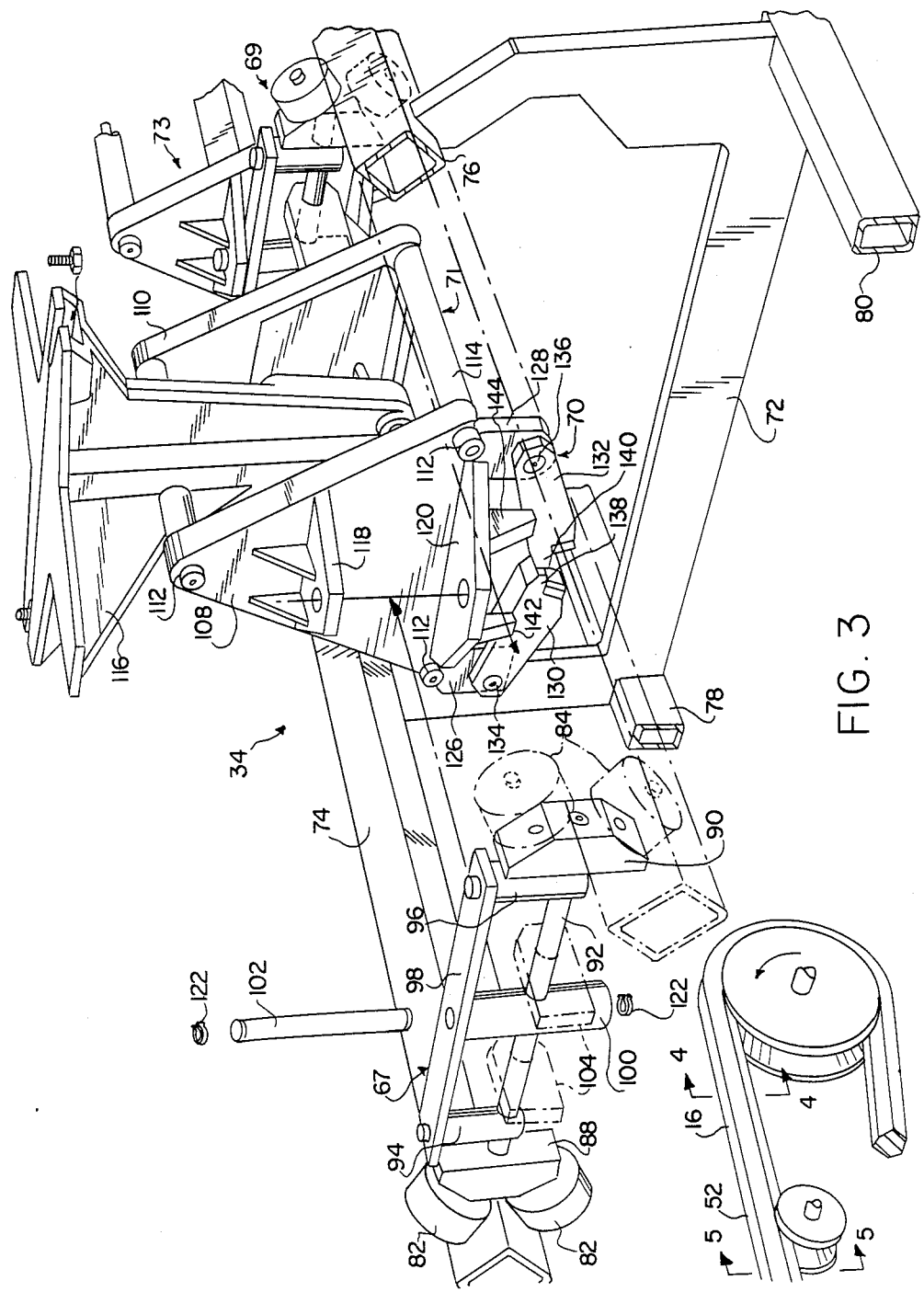
FIG. 3 is a perspective and exploded view of a part of a car shown to a larger scale than that used in FIG. 2.

FIG. 4 (drawn adjacent to FIG. 2) is a sectional view shown generally on line 4—4 of FIG. 3 and including a portion of a car at that location, this view illustrating the drive mechanism about to engage with the car; and FIG. 5 (also drawn adjacent to FIG. 2) is a view similar to FIG. 4 and showing the car moved to the position indicated by line 5—5 of FIG. 3, the mechanism then being in engagement with the car.

Figure 1:
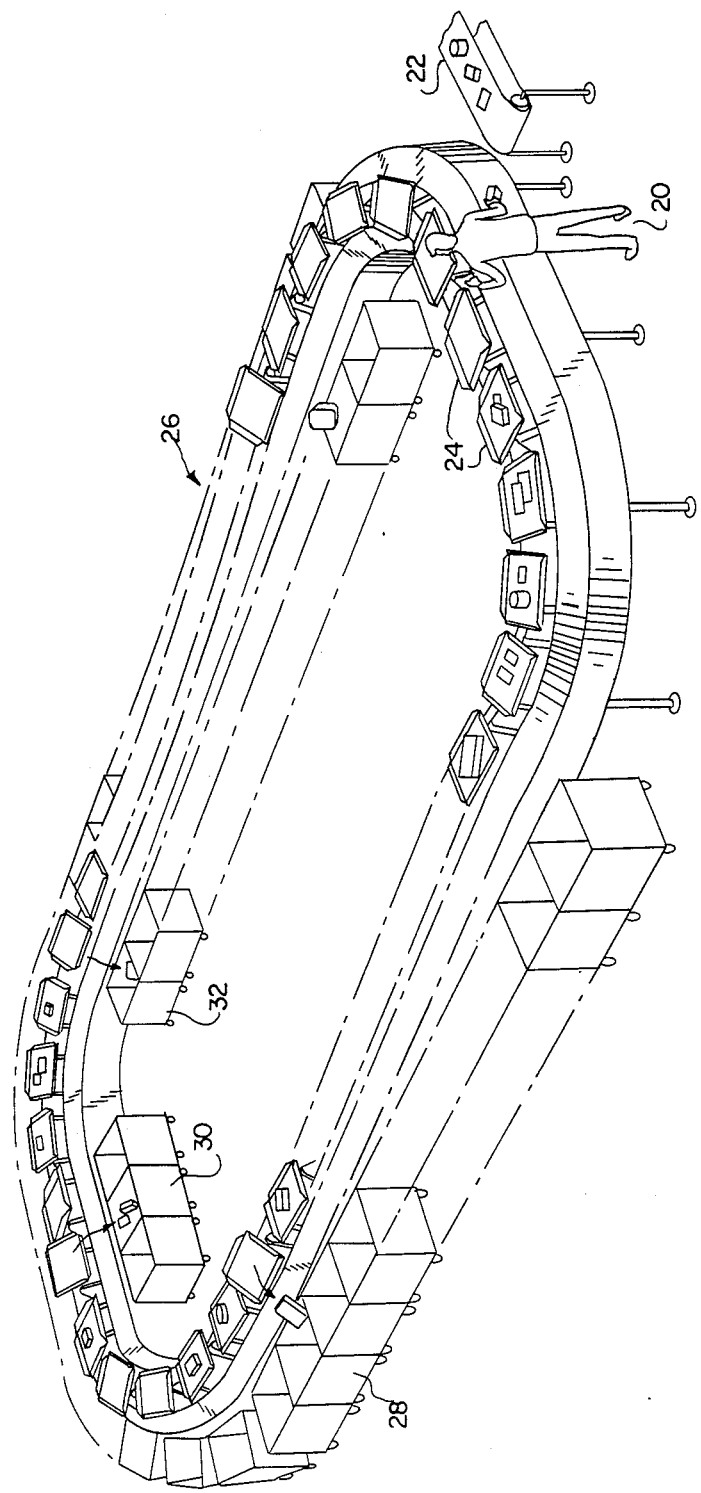
FIG. 1 is a perspective diagrammatic view of an endless conveyor system made up of a plurality of cars in use distributing parcels from a central location to selected locations around the system dependent upon the address information on the parcels, the system incorporating a preferred embodiment of drive mechanism according to the invention.

Reference is made firstly to FIG. 1 which shows an exemplary conveyor system shown diagrammatically to illustrate the type of arrangement with which the present drive mechanism can be used. The preferred embodiment of the drive mechanism will be described with reference to subsequent drawings. As seen in FIG. 1, an operator 20 is receiving parcels from a belt conveyor 22 and placing them on selected tiltable trays 24 of an endless conveyor system indicated generally by the numeral 26. Each of the trays is associated with one of a series of cars connected to one another to make a conveyor. With suitable conventional controls, the trays can be selected or programmed to carry a parcel to one of several locations such as bins 28, 30 or 32 where the parcel is collected.

The present invention is concerned with a drive mechanism for propelling the cars and associated trays 24 around past the bins to return to carry more parcels supplied by the operator 20.

Reference is next made to FIG. 2 which illustrates a portion of the endless conveyor system 26. A conveyor 33 is made up of cars 35 and is carried on a track indicated generally by the numeral 34 which also supports a drive mechanism indicated generally by the numeral 36. The driving connection made between the cars of the conveyor 26 and the drive mechanism will be described more fully with reference to FIG. 3. The drive mechanism 36 has a prime mover 40 which has an output sprocket 42 driving a chain 44 around a chainwheel 46. This chainwheel shares a shaft 48 with a pulley wheel 50 carrying a belt 52 so that the belt is driven when the prime mover is activated.

The belt 52 extends generally longitudinally under the endless conveyor between the pulley wheel 50 and a further pulley wheel 54 passing on its way over tensioning pulleys 56, 58 and then returning over a first upper pulley 60, a rubbing strip 62 and then over a second upper pulley 64. The pulleys 60, 64 and rubbing strip 62 maintain the upper run of the belt above the top extremity of the pulley 50 and expose it for engagement with the endless conveyor system as will be described. For the moment, it is significant to note that between the pulley 54 and pulley 60, there is an upwardly inclined ramp portion 66, a main portion on the rubbing strip and, between pulley 64 and pulley 50, there is a downwardly inclined portion 68. The main portion 65 of the belt runs on the rubbing strip 62 longitudinally in parallel with the conveyor. The belt 52 is driven continuously if the conveyor is to move and the conveyor is stopped by deactivating the prime mover 40.

FIG. 2 also illustrates the make-up of each car. In this Fig. the cars are moving right to left and the leading car, which is exemplary of all of the cars, consists of first and second bogies 67, 69 and first and second chassis 71, 73, the chassis 71 carrying a tray 24. The chassis are connected to the bogies to form universal joints so that each chassis can move independently of the others while moving along the track attached to adjacent chassis. The details of the cars will be described more fully with reference to FIG. 3.

In larger conveyor systems, more than one drive system may be used and possibly a more extensive single system having greater power and possibly a different belt arrangement. However, the principal will remain the same as that described with reference to the present exemplary structure.

Turning now to FIG. 3 which shows a part of a car 35 and track 34, it will be seen that the belt 52 presents the inclined ramp portion 66 to gripper mechanisms 70 as the cars of the conveyor move one at a time towards the drive mechanism. The conveyor is carried on track 34 which consists essentially of a series of frames 72 (one of which can be seen) to which is attached parallel rails 74, 76 and, below these rails, structural elements 78, 80 are provided to add rigidity. These elements are used to support the drive mechanism as can be seen by comparison with FIG. 2.

The rails 74, 76 are of square section with the sides lying at 45 degrees to the vertical. Inwardly facing surfaces provide runways for respective pairs of rollers 82, 84 associated with bogie 67 which is typical of all of the of bogies used in the conveyor. The bogie 67 includes outboard support blocks 88, 90 formed suitably to carry the rollers 82 and 84 and are connected by a transverse round rod 92 which is also attached to end uprights 94, 96. These uprights are attached to respective ends of a crossbar 98 and a central hollow post 100 is also attached to the crossbar and to the rod 92 to receive an axle 102. The bogie is attached permanently to a preceeding second chassis by a pair of arms 104 associated with that chassis. The arms are free to rotate on the round rod 92 and the bogie is therefore located in relation to the preceeding chassis to move angularly with respect to the bogie in a vertical plane only.

The first chassis 71 is shown in FIG. 3 where it will be seen that this chassis has arms projecting to the second bogie 69 and consists essentially of a pair of generally triangular shaped end elements 108, 110 connected to one another at the apices by bolts 112, the lower ones of which pass through a pair of spacers 114 (one of which is seen) and the other of which passes through a tray support structure 116. The upper bolt is arranged so that the tray support structure 116 can tilt sideways, and although this does not form any part of the invention, it is included for completeness to indicate that the conveyor carries trays which can be tilted using suitable structure to unload the tray at predetermined locations around the track.

Returning to the end element 108, it will be seen that it carries a pair of integral parallel flanges 118, 120 spaced apart vertically to engage about the ends of the bogie post 100 and drilled to receive the axle 102 which is retained in place by a pair of conventional circlips 122 adjacent its ends. Once this assembly is completed, the chassis 71 can rotate relative to the bogie in a horizontal plane so that in effect this chassis is articulated with respect to the previous chassis at a universal joint.

The first chassis 71 is followed by the second chassis 73. The second chassis is also made up of end plates and connecting bolts. It attaches to the bogies in the same way as chassis 71 and is noteworthy only because it is porportioned with the same length so that the space between every pair of bogies is the same. The result is a modular conveyor. Each car has two modules with one tray and one gripper mechanism 70. This permits for a short distance between successive articulated bogies to make for good cornering and to permit the use of relatively sharp bends in the track.

The gripper mechanism 70 mentioned previously with reference to the chassis 71 is carried on the end element 108. This element includes a pair of integral downwardly extending side projections 126, 128 from which depend respective dogs 130, 132. The dogs are attached by pivotal connections 134, 136 to the projections 126, 128 and are proportioned so that under the influence of gravity, nose portions 138, 140 will be in the positions shown ready to engage the ramp portion 66 of belt 52 as will be explained. The dogs are maintained in this position and prevented from falling further by the use of a shoulder (not seen) which engages the respective projections 126, 128. It will be clear from this view (and looking at dog 130) that the dog is thinned where it meets the pivotal connection 134 to provide a shoulder at the discontinuity between the thinned portion and the main body of the dog. This is a conventional technique for minimizing movement. A similar shoulder is of course provided on dog 132.

Downwardly projecting locating ribs 142, 144 are dependent from the underside of the flange 120. The ribs are spaced forwardly from a plane containing the forward surfaces of the projections 126, 128 sufficient to provide room for movement of the dogs between these projections and the ribs to stabilize the dogs.

Reference is next made to FIGS. 4 and 5 to illustrate the action of the gripper mechanism 70. As seen in FIG. 4, the belt 52 comes into contact with the nose portions 138, 140 and as the gripper mechanism continues forwardly, the dogs 130, 132 will be lifted about their pivotal connections 134, 136 by the action of the belt as it travels along the ramp portion 66 (FIG. 3). The motion will continue until the position shown in FIG. 5 is reached where a pair of wear pads 146, 148, defining engagement faces for gripping the belt 52, have come into engagement to either side of the hexagonally shaped belt. Further, the center of the belt is now above a line drawn between the centers of the pivotal connections 134, 136 so that there is an "over-center" action resulting in the dogs 130, 132 remaining in the position shown in FIG. 5 under the influence of the energy stored in the deformed belt. This means that the belt is effectively maintained in this position because, if anything, it wants to move upwardly resulting in a reduced force on the rubbing strip 62 (FIG. 2). However, further upward motion of the dogs is prevented because they are in engagement with the underside of the flange 120, so that the dogs remain in the FIG. 5 position as the car travels along the main portion of the belt above the rubbing strip.

In the position shown in FIG. 5, the gripper mechanism 70 causes the associated chassis and hence the endless conveyor to move with the belt. As seen in FIG. 2, the drive mechanism is proportioned so that there are at least two gripper mechanisms in contact with the belt at any one time. Once the gripper mechanism reaches the downwardly inclined portion 68, the belt breaks the over-center action of the dogs 130, 132 which then tend towards the position shown in FIG. 3, aided by gravitational forces. The belt is then released to continue its travel around the pulley 50.

In general, the gripper mechanism 70 operates between a rest position shown in FIG. 4 and an engaged position shown in FIG. 5. In the rest position, the dogs hang freely, prevented from further downward motion by engagement with the downward projections 126 and 128, and in the engagement position, upward motion is prevented by the flange 120.

In general the gripper mechanism can be used on any wheeled structure supported by a track. Of course, the structural components may have to be modified for greater strength. However, the principle is common.

It should be noted that there is no preferred location for the gripper mechanism with reference to the length of the belt. The mechanism can attach at any location. The operation is quiet, simple and effective.

The parts of the cars can include moulded parts of engineered synthetic plastics such as glass fibre reinforced acrylobutadienestyrene, (abs).

Other structures and devices are within the scope of the invention as claimed.

The embodiments of the invention in which an exclusive property or privilege is claimed are defined as follows:

1. A drive system for moving wheeled structures longitudinally along a supporting track, the drive system comprising:
   a drive element extending longitudinally below the track and having an upwardly inclined ramp portion, a main portion extending in parallel with the track and leading from the ramp portion, and a downwardly extending portion leading from the main portion;
   means adapted to drive the element such that the main portion moves at a speed equal to that at which the wheeled structure is intended to move;
   a gripper mechanism for attachment to the wheeled structure for engagement with the element, the gripper mechanism including gripper means moveable vertically upwards from a rest position to an engaged position, and including an engagement means for meeting the element at the ramp portion so that as the wheeled structure moves along the track the element moves the gripper means into the engaged position where the gripper means is locked on the element to move with the main portion of the element.

2. A drive system as claimed in claim 1 in which the drive element is a continuous belt.

3. A drive system as claimed in claim 2 in which the gripper means includes a pair of dogs arranged to grip the belt automatically as the wheeled structure travels over the ramped portion and to receive driving forces from the belt as the structure travels with the belt along the main portion.

4. A conveyor for moving along a supporting track, the conveyor comprising:
   a plurality of cars connected to one another, each car including first and second bogies, a first chassis coupled for universal movement to a said first bogie and to a said second bogie, a second chassis coupled for universal movement to the said second bogie and adapted to be connected for universal movement to another first bogie of another car;
   a drive element extending longitudinally below the track and having an upwardly inclined ramp portion, a main portion extending in parallel with the track and leading from the ramp portion, and a downwardly extending portion leading from the main portion;
   means adapted to drive the element such that the main portion moves at a speed equal to that at which the cars are intended to move;
   gripper mechanisms attached one to a car for engagement with the element, each gripper mechanism including gripper means moveable vertically upwards from a rest position to an engaged position, and including an engagement means for meeting the element at the ramp portion so that as the car moves along the track the element moves the gripper means into the engaged position where the gripper means is locked on the element to move with the main portion of the element.

5. A drive system as claimed in claim 1 in which the gripper means comprises a pair of dogs, a pair of pivotal connections by which the respective dogs are suspended for pivotal movement between the rest position and the engaged position, the axes of the pivotal connections being parallel to said main portion and the dogs having opposing engagement faces and overhanging nose portions so that movement of the wheeled structure past the ramp portion of the drive element results in the drive element engaging the nose portions and lifting the dogs towards the engaged position, which movement continues until the dogs are in the engaged position with the wheeled structure above the said main portion to drive the wheeled structure with the drive element.

6. A drive system as claimed in claim 2 and further including a rubbing strip underlying the main portion.

7. A conveyor as claimed in claim 4 in which the cars form a continuous conveyor with each car attached to two adjacent cars by first bogies.

* * * * *